April 22, 1930. G. A. TRAUGER 1,755,526
DEVICE FOR CONTROLLING TRACTORS FROM A DISTANCE
Filed July 11, 1927
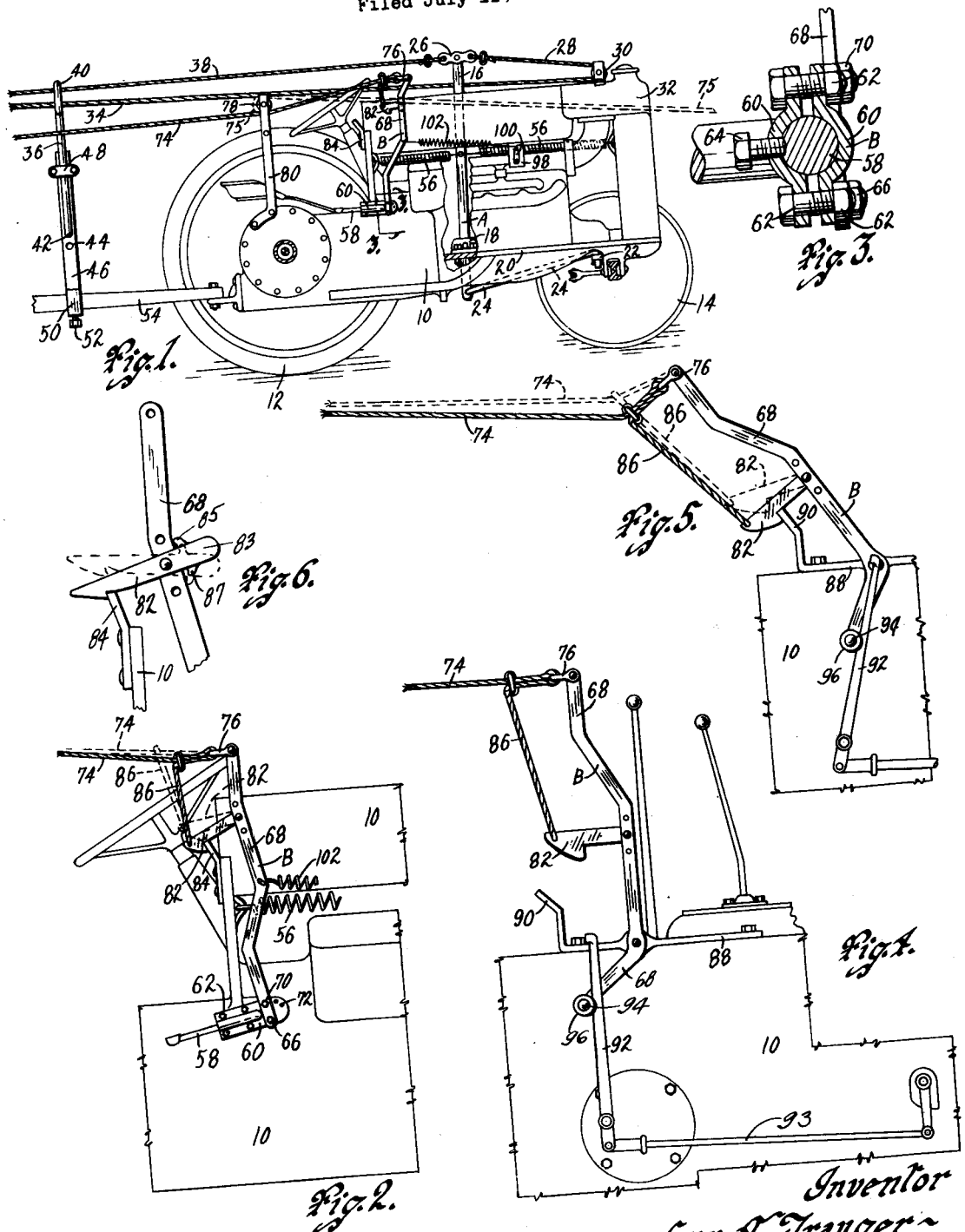

Patented Apr. 22, 1930

1,755,526

UNITED STATES PATENT OFFICE

GUY A TRAUGER, OF ALDEN, IOWA

DEVICE FOR CONTROLLING TRACTORS FROM A DISTANCE

Application filed July 11, 1927. Serial No. 204,786.

The object of my invention is to provide a device for controlling tractors when the operator is at a distance from the tractor itself, the parts of the device being of simple, durable and comparatively inexpensive construction.

A further object is to provide a mounting on the tractor to which a steering lever can be pivoted, the steering lever itself being operatively connected to the steering mechanism of the front wheels of the tractor and further to provide a pair of balancing springs on the steering lever to normally maintain the front wheels of the tractor in a straight ahead position.

Still a further object is to provide a control rope for moving the steering lever, the control rope terminating at any desired distance behind the tractor.

Still a further object is to provide a control mechanism for the clutch of the tractor consisting of a lever operatively connected with the clutch pedal and adapted to be moved by a rope when the operator is some distance back of the tractor.

Still a further object is to provide mechanism on the clutch lever adapted to lock the clutch in disengaged position.

Still another object is to provide means controlled by the clutch control rope itself for unlocking the clutch lever for allowing it to move to position where the clutch is engaged.

Still a further object is to provide a connection between the clutch lever and the governor of the tractor engine so that when the clutch is moved to disengaged position the governor will be adjusted to idling position so that the motor will not race when the tractor is standing still.

With these and other objects in view, my invention consists in the construction, arrangement and combination of the various parts of my device whereby the objects contemplated may be attained, as hereinafter more fully set forth, pointed out in my claims, and illustrated in the accompanying drawings, in which:

Figure 1 is a side elevation of a tractor with the near side wheels removed and illustrating my control device attached thereto.

Figure 2 is an enlarged view of a portion of the tractor illustrating my clutch control device in a different position.

Figure 3 is an enlarged detail sectional view taken on the line 3—3 of Figure 1.

Figure 4 illustrates the manner of connecting my clutch control to a type of tractor other than that illustrated in Figure 1.

Figure 5 is a view similar to Figure 4 showing the clutch lever in another position; and Figure 6 is a view of a modified form of clutch latch.

On the accompanying drawings I have used the reference numeral 10 to indicate generally a tractor. The tractor 10 is provided with rear wheels 12 and steerable front wheels 14. To the tractor 10 I apply my control device consisting of a steering control mechanism A and a clutch control mechanism B.

The steering control mechanism A comprises a steering lever 16 pivotally mounted on the tractor 10. This mounting is made by attaching a bracket 18 to a flange 20 or other portion of the tractor 10 and pivoting the lever 16 thereon.

The steering mechanism of the tractor 10 includes an arm 22 adapted upon movement to steer the front wheels thereof. A link connection 24 is provided for operatively connecting the steering lever 16 to the arm 22. The link 24 is inserted through a hole in the lower end of the steering lever 16 and in a hole in the arm 22 so that the link is pivotally mounted with relation to the lever and the arm.

Pivoted to the upper end of the steering arm 16 is a connecting member 26 formed with an eye at each of its ends. Secured to the forward end of the connecting member 26 is a steering control rope having a portion 28 extending forwardly and around a pulley 30. The pulley 30 is mounted in a bracket which may be secured to the radiator 32 of the tractor.

The steering control rope then has a portion 34 extending back through a line guide 36. The portion 34 of the rope may be any desired length so that the tractor can be controlled from any desired distance behind it. A second rope 38 is secured to the free end of the connecting member 26 and extends back to the operator in a manner similar to the rope 34. The ropes 34 and 38 are used to impart swinging movement to the steering arm 16 and consequently the front wheels 14 for guiding the tractor.

The line guide 36 is provided with a looped portion 40 through which the ropes 34 and 38 extend. The guide 36 is formed of a rod having a bent end 42 adapted to be selectively received in openings 44 formed in a bar 46. A clamp 48 is utilized to secure the upper end of the rod 36 to the bar 46. The bar 46 is provided with a U-shaped portion 50 having a set screw 52 for forming a clamp to extend around the tongue 54 of some device such as a binder which is attached to the draw bar of the tractor.

Secured to the steering arm 16 is a pair of springs 56. The free ends of the springs 56 are secured to spaced points on the tractor 10 and are provided for the purpose of keeping the steering arm 16 in a central position whereby the front wheels 14 normally guide the tractor straight ahead. Steering movement is imparted to the steering lever 16 against the action of one or the other of the springs 56 so that when the ropes 34 and 38 are released, the lever 16 will be brought back to a central position or a position where the springs 56 are balanced.

For controlling the clutch pedal 58 of the tractor I provide a two part connecting device 60 adapted to fit on each side of the pedal 58. The connecting member 60 encircles the clutch pedal 58 and is held thereon by bolts 62. A set screw 64 is screwed in one part of the connecting member 60 to prevent rotation or sliding movement of the connecting member relative to the clutch pedal.

Pivoted as at 66 to the connecting member 60 is a clutch lever 68. A bolt 70 extends through the clutch lever 68 and is adapted to selectively extend through openings 72 in the connecting member 60 so that the clutch lever 68 can be adjusted relative to the connecting member.

It may here be mentioned that the clutch pedal 58 is normally constrained to operative position by spring means within the clutch itself. The clutch lever 68 and clutch pedal 58 can therefore be moved to the position illustrated in Figure 2 by means of a rope 74. The clutch control rope 74 is connected to a clevis 76 pivoted on the upper end of the clutch lever 68 and extends backwardly around a pulley 78. The pulley 78 is mounted in a bracket 80 secured in any convenient manner to the tractor 10. The purpose of the pulley 78 is so that the rope 74 can extend around it and then forwardly as indicated by the dotted line position 75 in Figure 1. This allows the clutch pedal 58 to be controlled from the front of the tractor as for instance when a belt drive is being used on a machine ahead of the tractor.

For holding the clutch lever 68 in the position illustrated in Figure 2 so that the clutch pedal 58 is in inoperative position I provide a latch 82 pivoted to the clutch lever 68. The latch 82 is adapted to coact with a latch coacting member 84 bolted or otherwise secured to the tractor 10. The weight of the latch 82 causes such coaction. The free end of the latch 82 is connected by a short rope 86 to the clutch control rope 74 so that in moving the clutch lever 68 to the position shown in Figure 2 the lever 68 must first be moved so that the latch 82 will have time to fall when the rope 74 is slackened for allowing the latch 82 to drop over the member 84 without the spring 102 and the spring in the clutch itself pulling the lever far enough forward to prevent catching of the latch on the member 84. When it is desired to unlatch the latch 82 it is merely necessary to pull on the rope 74 whereby the latch 82 may be raised.

In Figure 4 I have illustrated the clutch control lever 68 as being pivoted to a mounting bar 88. The mounting bar 88 may be bolted to the frame of the type of tractor illustrated and has a latch coacting member 90 formed on it adapted to be engaged by the latch 82. Operative connection is made with the foot pedal 92 of the tractor 10 illustrated in Figure 4 by means of a roller 96. The roller 96 is journaled on a pin 94 secured to the lower end of the lever 68 and is adapted to engage the foot pedal 92 and move it to the position illustrated in Figure 5 upon backward movement of the lever 68 caused by pulling on the rope 74.

In Figure 6 I have illustrated a modified form of latch 82. This latch has a counterbalancing extension 83 slightly lighter than the hook end of the latch so that when the clutch lever 68 is pulled backwardly it will engage the member 84 by gravity. A quick pull on the rope 74 serves to tip this clutch latch to the dotted line position so that it will disengage the member 84 and the clutch lever 68 can be allowed to swing forward. In this form of clutch latch, the rope 86 is dispensed with. Stops 85 and 87 may be formed on the clutch latch 82 to prevent too much swinging movement of the latch.

Some tractors are provided with a clutch adapted to move to two positions, one where the clutch is engaged and the other where it is disengaged. These clutches are not spring actuated like the ones thus far described. A clutch of this type can be operated by placing a clutch control identical to the steering control A so that the control lever can be moved in either direction. The springs 56, of course, are not needed. The clutch is usually controlled by a rod similar to the rod 93 shown in Figure 4 and this rod can be connected to the lower end of the clutch lever of this type similar to the rod 24 which is connected to the lower end of the lever 16. If found desirable the single rope 38 could be used and a spring could be utilized to replace the rope 28 so that the rope 38 would move the lever in one direction and said spring would move it in an opposite direction.

Most tractors are provided with a governor such as the one illustrated at 98. The governor 98 has an arm 100 thereon for adjusting the governed speed of the tractor engine. I have found it desirable when the clutch is disengaged to move the arm 100 to low position so that the tractor engine will not race when the clutch is disengaged. This is accomplished by connecting the arm 100 to the clutch lever 68 by a spring 102. Movement of the lever 68 to the position illustrated in Figure 2 serves to move the arm 100 to low adjustment position.

From the foregoing description it will be obvious that I have provided a clutch control for a tractor which serves to move the clutch pedal against the action of the clutch spring. The clutch control can then be locked in this position and means is provided, controllable by the one rope, for unlocking the lever to allow the clutch pedal to return to operative position.

Some changes may be made in the arrangement and construction of the parts of my improved device without departing from the real spirit and purpose of my invention, and it is my intention to cover by my claims, any modified forms of structure or use of mechanical equivalents, which may be reasonably included within their scope.

I claim as my invention:

1. In combination with a tractor having a spring actuated clutch pedal thereon, a control device comprising a lever operatively connected to said clutch pedal, a rope for moving said lever in one direction, a latch pivoted to said lever, a latch coacting member mounted on said tractor and a connection between said rope and said latch whereby the latch may be lifted when the rope is taut.

2. In combination with a tractor having a spring actuated clutch pedal thereon, a control device comprising a lever operatively connected to said clutch pedal, a rope for moving said lever in one direction, a latch pivoted to said lever, a latch coacting member mounted on said tractor, a connection between said rope and said latch whereby the latch may be lifted when the rope is taut and may be dropped to engage said latch coacting member when the rope is slackened.

3. In combination with a tractor having a spring actuated clutch pedal thereon, a control device comprising a lever operatively connected to said clutch pedal, a rope for moving said lever in one direction, a latch pivoted to said lever, a latch coacting member mounted on said tractor, said latch being normally constrained by gravity to coact with said member and a connection between said rope and said latch whereby the latch may be lifted when the rope is taut for the purpose of disengaging said latch from said latch coacting member.

4. In combination with a tractor having a spring actuated clutch pedal thereon, a control device comprising a lever operatively connected to said clutch pedal, a rope for moving said lever in one direction, a latch pivoted to said lever, a latch coacting member mounted on said tractor, said latch being normally constrained by gravity to coact with said member, a flexible connection between said rope and the free end of the latch whereby the latch may be lifted to disengage from said member by tightening said rope.

Des Moines, Iowa, June 10, 1927.

GUY A. TRAUGER.